May 31, 1966  G. W. JACKSON  3,253,775
FLUID SUPPLY SYSTEM
Original Filed Nov. 29, 1963
3 Sheets-Sheet 1
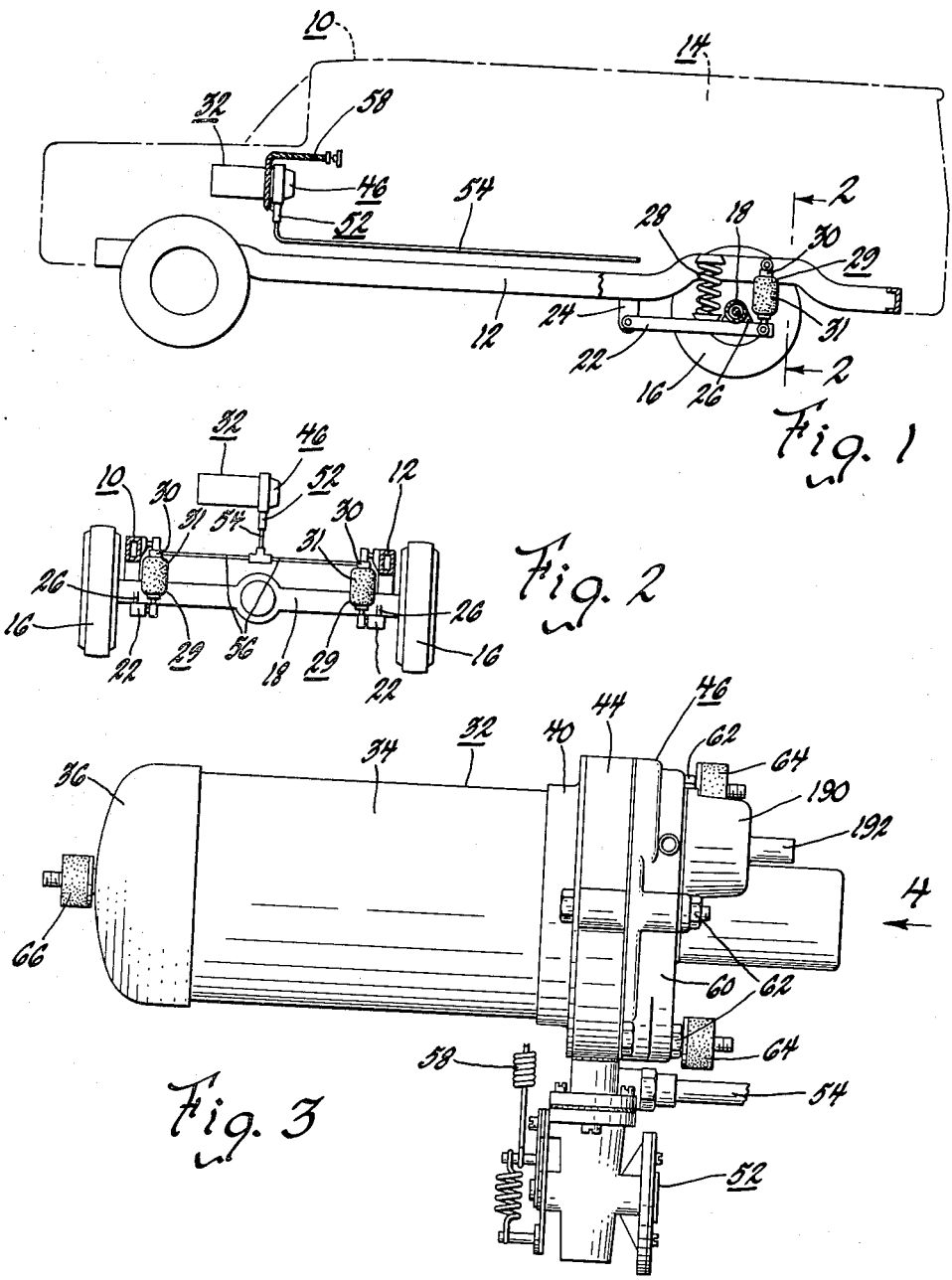
INVENTOR.
George W. Jackson
BY
J.C. Evans
HIS ATTORNEY May 31, 1966  G. W. JACKSON  3,253,775
FLUID SUPPLY SYSTEM
Original Filed Nov. 29, 1963  3 Sheets-Sheet 2
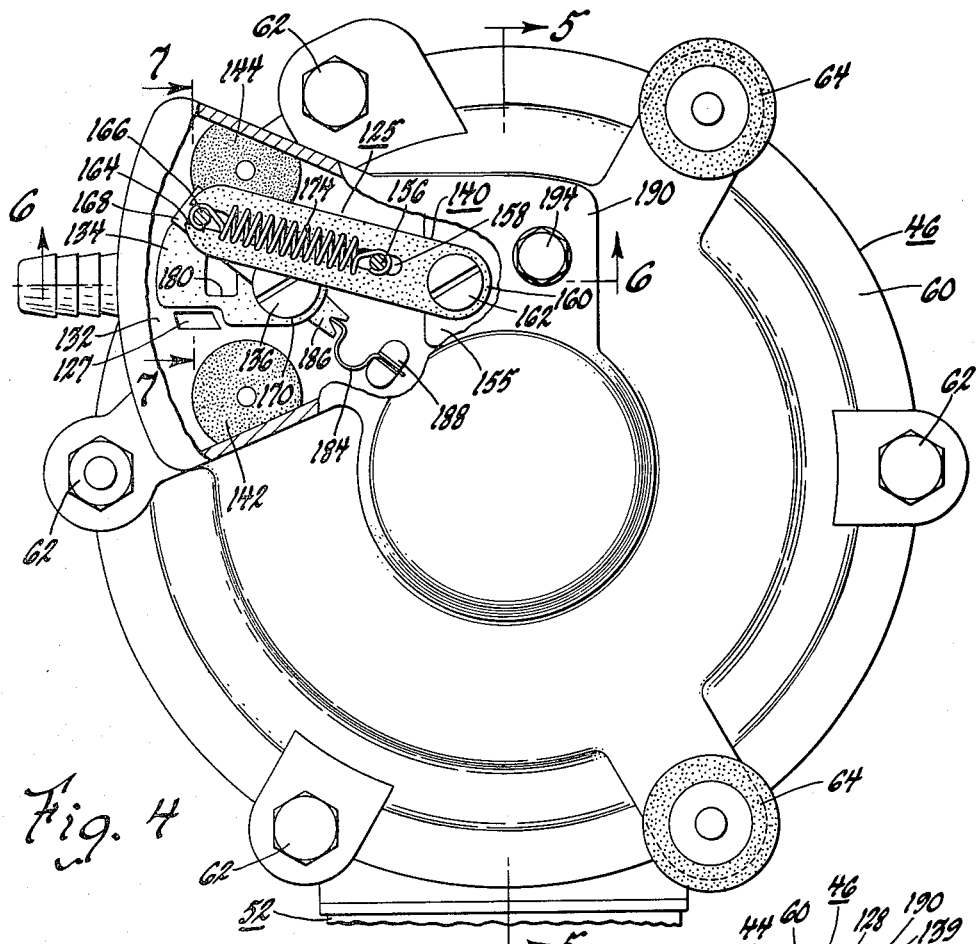
Fig. 4
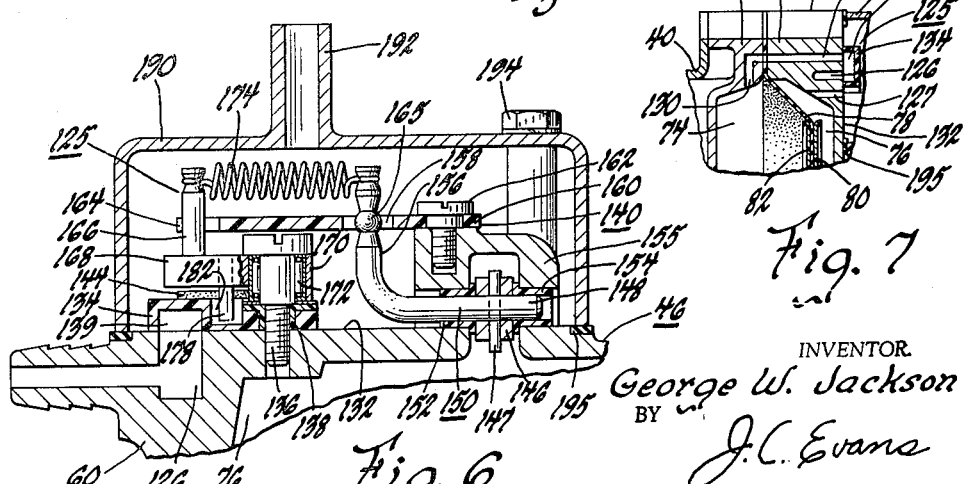
Fig. 6
Fig. 7
INVENTOR.
George W. Jackson
BY
J. C. Evans
HIS ATTORNEY

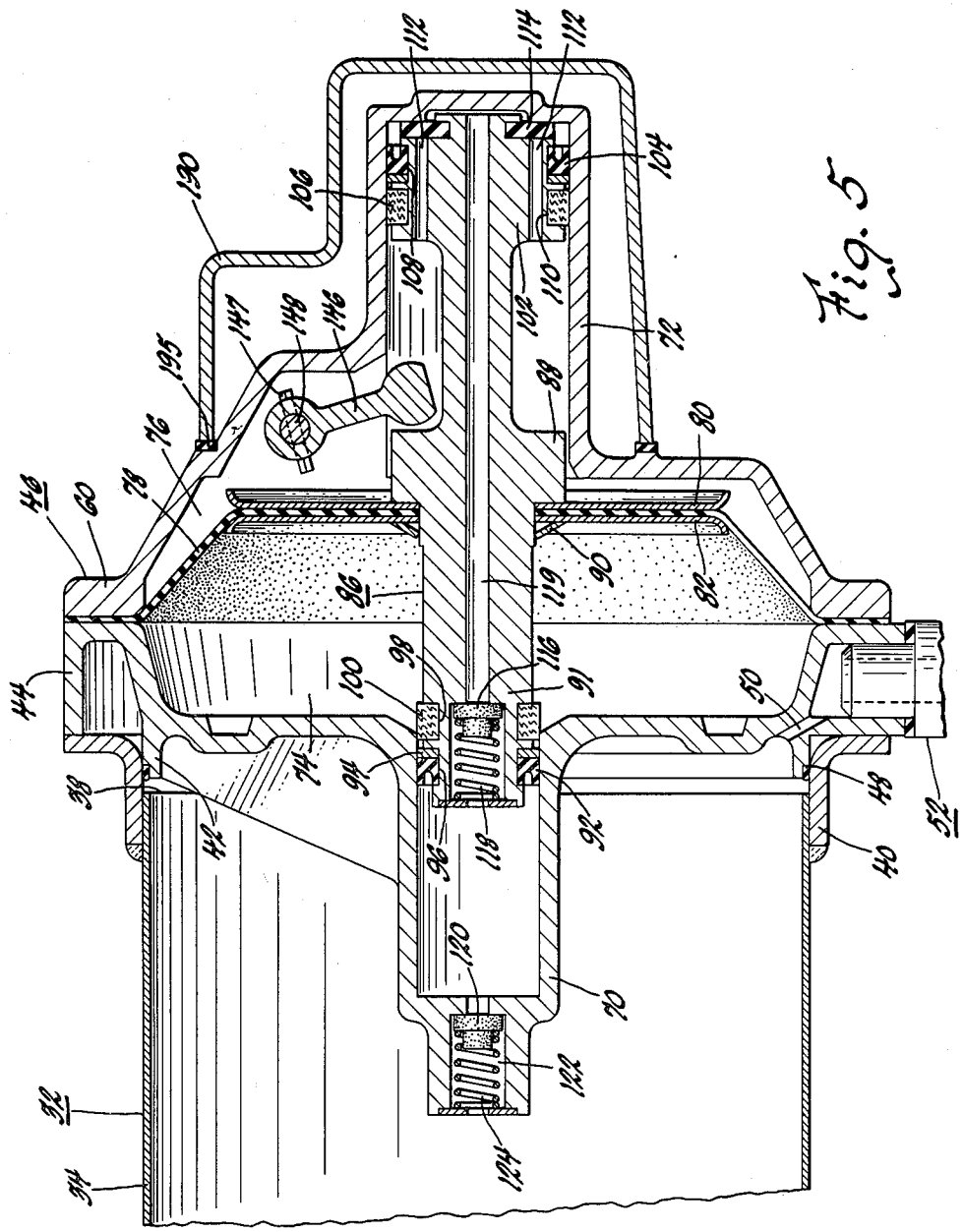

United States Patent Office 3,253,775
Patented May 31, 1966

3,253,775
FLUID SUPPLY SYSTEM
George W. Jackson, Dayton, Ohio, assignor to General Motors Corporation, Detroit, Mich., a corporation of Delaware
Original application Nov. 29, 1963, Ser. No. 327,008. Divided and this application Mar. 30, 1965, Ser. No. 444,017
6 Claims. (Cl. 230—52)

This application is a division of application Serial No. 327,008, filed November 29, 1963.

This invention relates to an improved pressurized fluid supply system for association with an air lift suspension system or the like.

In many present-day pressure actuated systems, for example, the air lift suspension system of an automobile or the like, there is a definite need for a low-cost, compactly arranged pressurized fluid supply system that is reliable and positive acting under a wide variety of operating conditions. While various arrangements of this type have been proposed, no single system has been completely satisfactory.

An object of the present invention, therefore, is to provide a highly efficient, positive pressure supply system for association with a pressure actuated device, for example, an air lift spring component of an air lift suspension system including the provision of an improved combination pump-reservoir structure having compact dimensional characteristics suited for location in a space or compartment of limited dimensions in a motor vehicle or the like.

A further object of the present invention is to provide such a combination pump-reservoir structure including improved means for minimizing noise transfer from the operating pump structure to the passenger compartment of a vehicle associated therewith.

A further object of the present invention is to improve means for supplying a pressurized fluid to a pressure actuated device by the provision of a combination reservoir and pump assembly wherein a portion of the pump is supported on the reservoir to serve as one wall of the pressure reservoir and to further serve as one of the walls of the pump casing with the pump further being characterized by a pair of axially aligned pistons therein interconnected by a piston rod operatively associated with a diaphragm for reciprocation within a pair of axially spaced cylinders that are aligned with the pistons wherein the flow of pressurized fluid proceeds from the first compression cylinder through an axially directed passageway through the piston rod and thence through the second-stage compression chamber and an outlet therefrom into said reservoir under the control of a valving arrangement that lends itself to economical mass production.

A still further object of the present invention is to provide an improved compactly arranged pressurized fluid supply system including the provision of a reservoir formed in part by a part of the housing of an improved two-stage diaphragm operated compressor including the provision of a diaphragm actuated selector valve arrangement for alternately directing atmospheric and subatmospheric pressure sources to either side of an imperforate operating diaphragm for producing reciprocating movement thereof to drive piston portions of the pump within cylinders to effect the multiple-stage compression, wherein the selector valve arrangement is characterized firstly by a minimal consumption of limited diaphragm motive power in assuming alternate fluid controlling positions and secondly by substantially noiseless operation.

Further objects and advantages of the present invention will be apparent from the following description, reference being had to the accompanying drawings wherein a preferred embodiment of the present invention is clearly shown.

In the drawings:

FIGURE 1 is a view in side elevation of a vehicle suspension including the pressurized fluid supply system of the present invention;

FIGURE 2 is a view in vertical section taken along the line 2—2 of FIGURE 1;

FIGURE 3 is an enlarged view in side elevation of the improved pressurized fluid supply system;

FIGURE 4 is a fragmentary, enlarged view in end elevation looking in the direction of arrow 4 in FIGURE 3;

FIGURE 5 is a view in vertical section taken along the line 5—5 of FIGURE 4;

FIGURE 6 is a view in horizontal section taken along the line 6—6 of FIGURE 4; and FIGURE 7 is a reduced sectional view taken along the line 7—7 of FIGURE 6.

In FIGURES 1 and 2 of the drawings, a vehicle 10 is illustrated as including a sprung assembly comprising a chassis frame 12 having a body 14 supported thereon along with conventional parts normally associated therewith and further including an unsprung assembly comprising ground engaging wheels 16 supported on an axle housing 18 in a conventional manner along with other parts normally associated with such wheels and housings. The sprung assembly represented by the chassis frame 12 and body 14 is supported relative to the axle housing 18 of the unsprung assembly by means representatively illustrated as including a pair of control arms 22 each having one of its ends pivotally secured to a bracket 24 fixed to the suspended chassis frame 12. Each control arm 22 is also fixedly secured adjacent its opposite end to the axle housing 18 through a bracket 26 to thereby serve as a support for one of a pair of coil type chassis springs 28 mounted between the control arms 22 and the frame 12 for providing a desired spring support between sprung and unsprung masses. In addition to the supporting action of each coil type chassis spring 28, additional ride control is provided by a pair of shock absorber and air spring auxiliary suspension units 29, respectively, pivotally secured at the opposite end of one or the other of control arms 22 and the frame 12.

Details of a typical combination shock absorber and air spring auxiilary suspension unit 29 are more particularly set forth in the United States Patent 3,042,392 issued July 3, 1962, to Schmitz et al., with it being understood that each of the auxiliary units 29 basically includes a direct-acting hydraulic shock absorber 30 having an inflatable element or air spring 31 thereon of a suitable resilient material that, when inflated, will supplement the load carrying capacity of the coil springs 28 so as to prevent excessive engagement of bump stops on the vehicle and/or an undue elevation of the front end of the vehicle when heavy loads are placed in the body 14 in the vicinity of the axle housing 18. The above-described system, of course, is merely representative, it being understood that the improved features of the pressurized fluid supply system of the present invention are equally well suited for association with arrangements having pressure actuated components equivalent to air springs 31.

Referring now to FIGURES 3 through 7, a pressurized fluid system 32 is illustrated including an elongated cylindrical pressure reservoir 34 having a closed end 36 and an open end 38 that has a ring-like reinforcing bracket 40 connected thereto for supportingly receiving an outwardly directed flange 42 on a first housing portion 44 of a vacuum operated pump 46. Between the bracket 40 and flange 42, as best shown in FIGURE 5, an annular sealing element 48 of resilient material is located in sealing engagement therebetween to prevent fluid leakage outwardly at the open end 38 of reservoir 34.

In the illustrated arrangement, the housing portion 44 has a passageway 50 directed therethrough intercommunicating the interior of the reservoir 34 with a control valve assembly 52 controlling flow of pressurized fluid from the reservoir 34 through a conduit 54 intercommunicating the interior of the valve 52 with fluid lines 56 running to each of the air springs 31 of the auxiliary units 29. For purposes of this application, it is only necessary to point out that the control valve is a type that can be manually controlled by means of a Bowden wire actuator assembly 58 located conveniently to an operator of the vehicle, for example, on the dashboard where it is selectively operable to condition the valve 52 to either communicate the auxiliary suspension unit 29 with pressurized fluid within the reservoir 34 or with atmosphere depending upon whether or not it is desired to obtain a supplemental supporting action to that of springs 20. For a more detailed explanation of valve 52, reference is made to copending United States application, Serial No. 327,008, filed November 29, 1963, of George W. Jackson for Control Valve, with it being understood that the Jackson valve is only representative of many control valves that would be suited for controlling flow of fluid between the system of the present invention and a pressure actuated device associated therewith. Referring now particularly to pump 46 in FIGURES 4–7, an economical, compact, two-stage compressor arrangement is illustrated as including a second housing portion 60 joined to the first housing portion 44 and to the bracket 40 on the reservoir 34 by a plurality of circumferentially located stud and nut fasteners 62. Certain of the nuts on fasteners 62 are formed to serve as a means for threadably fastening a plurality of tubular damping pads 64 on the pump 46. A like pad 66 is secured to the closed end of reservoir 32 exteriorly thereof to cooperate with pads 64 to prevent transmission of vibrations from the improved system to its supporting framework.

The pump 46 is further characterized by the fact that housing portion 44 has a hollow cylindrical extension 70 thereon directed interiorly of the reservoir 34 in axial alignment with a somewhat larger diameter hollow cylindrical extension 72 on housing part 60 extending oppositely to extension 70. In the illustrated embodiment, the cylindrical extension 70 is opened at the outer end thereof and the cylindrical extension 72 is closed at the outer end thereof.

The joined housing portions 44, 60 more particularly define a space or chamber intermediate the cylindrical extensions 70, 72 divided into a first and a second compartment 74, 76 by a centrally apertured, flexible diaphragm element 78 located within and directed transversely of the pump housing chamber where the outer periphery of the diaphragm 78 is in juxtaposition with the outer periphery of both housing portions 44, 60 at the juncture thereof being held in sealing engagement therewith by the screw and nut fasteners 62. Ring-shaped reinforcing discs 80, 82 are located on either face of the diaphragm 78 so that the central openings therethrough are concentric one with the other to receive an elongated piston rod 86 extending substantially centrally of and axially through compartments 74, 76.

The elongated piston rod 86 more particularly includes a radially outwardly directed shoulder portion 88 thereon located intermediate the ends thereof having one face thereof located in axial abutment with the disc 80 to cooperate with an annular snap ring element 90 on rod 86 that is biased against the disc 82 to hold the diaphragm 78 in sealing engagement with the rod 86 and discs 80, 82 at the interfaces therebetween to thereby seal against fluid flow between compartments 74, 76.

One end 91 of the rod 86 supports an annular channel-shaped sealing element 92 that sealingly engages the inner surface of the cylindrical extension 70 when held in place by an annular filler washer 94 in an annular recess 96 in the outer surface of the end of rod 86. A like recess 98 spaced axially inwardly of recess 96 supports an annular washer 100 of a suitable porous material, for example, felt, that is impregnated with a suitable lubricant for reducing sliding friction between the outer periphery of the end of rod 86 and the inner surface of extension 70.

The opposite end 102 of the rod 86 is of a somewhat larger diameter than end 91 and supports an annular channel-shaped sealing element 104 and annular lubricating washer 106 in recesses 108, 110 in the outer periphery thereof serving the same function as elements 92, 100 on the end 91. The end 102 further includes a plurality of circumferentially spaced passageways 112 directed therethrough for intercommunicating compartment 76 with the interior of cylindrical extension 72. On the end face of piston rod end 102 an annular valving element 114 of a suitable resilient material is supported to extend radially outwardly from adjacent the central axis of rod 86 so that a free edge thereof overlies the ends of passageways 112. The valving element 114 thereby serves as a means for checking fluid flow from the interior of extension 72 into compartment 76 while allowing substantially free fluid flow from the compartment 76 into the interior of cylinder 72 prior to first-stage compression. A check valve element 116 supported within the opposite end 91 of the piston rod 86 is biased into a seated position by a spring 118 to control flow of first-stage compressed fluid through an axial opening 119 directed centrally through the piston rod 86 for communicating the interior of extension 72 with the interior of extension 70 and a check valve 120 supported within a small diameter interior end space 122 in cylindrical extension 70 is biased closed by spring 124 to control second-stage compressed fluid flow from pump 46 into reservoir 34.

By virtue of the provision of valving elements of the aforedescribed type in association with a reciprocating diaphragm actuated piston rod, a multiple-stage compression of a fluid such as air can be accomplished by a limited pressure differential such as established by the vacuum system of an automobile acting alternatively on opposite sides of the flexible diaphragm 78 under the control of an improved selector valve assembly 125.

The fluid flow in the illustrated embodiment of the improved compactly arranged pressurized fluid supply system includes the passage of fluid into compartment 76 from valve 125 and from the compartment 76 across the passageways 112 in piston end 102 upon reciprocation of piston rod 86 inwardly of cylindrical extension 70 and exteriorly of cylindrical extension 72 and thence past the free edge of annular valving element 114 which is moved out of axial abutment with the end of the piston 102 during such movement and thence into the progressively increasing interior space of cylindrical extension 72. Following a predetermined stroke during which time the interior space of cylindrical extension 72 has progressed to a predetermined maximum volume, the piston rod 86 will be reciprocated in an opposite direction by changing the connection between compartments 74, 76 on opposite sides of diaphragm 78 and high and low pressure systems. During the opposite reciprocation of piston rod 86 by diaphragm 78, the piston rod moves exteriorly of cylindrical extension 70 and interiorly of cylindrical extension 72 so that fluid within the progressively diminishing interior space of extension 72 is forced therefrom axially through the passageway 119 to produce a pressure differential across the check valve element 116 sufficient to move it against the action of spring 118 sufficiently to allow first-stage compressed fluid to flow interiorly of the progressively increasing interior space of cylindrical extension 70. During this opposite reciprocation of piston rod 86 the valving element 114 is biased by the pressure buildup within the interior space of cylindrical extension 72 against the passageways 112 communicating compartment 76 and the interior of cylindrical extension 72 to thereby prevent fluid leakage into the compartment 76 which is evacuated during such opposite reciprocation in a manner to be discussed. Upon reciprocation of the piston rod 86 in the first mentioned direction the first-stage compressed fluid in the interior space of cylindrical extension 70 is further compressed by movement of the piston end 91 inwardly thereof with the compressed fluid producing a pressure differential across the check valve element 120 sufficient to move it against the biasing action of spring 124 to thereby communicate the interior of reservoir 34 with the interior of cylindrical extension 70.

The improved valving arrangement for producing the aforementioned controlled two-stage compression lends itself to economical mass production methods of assembly and also includes the additional feature of elements at each end of the piston rod that materially reduce frictional losses in the operating device to thereby improve the efficiency thereof by maximizing output pressure capability of the limited pressure differential across the diaphragm 78.

In addition to the reduced friction at the interface between the piston rod end portions and the cylindrical extensions 70, 72 and the inherent reduced frictional losses of the diaphragm 78, the rod driven selector valve assembly 125 that alternately connects the compartment 74, 76 with a vacuum or atmospheric source for effecting the opposite reciprocation of rod 86 is constructed and arranged so as to operate without materially affecting the efficiency of the compressor portion of the system.

More particularly, the selector valve assembly 125 is representatively shown as being associated with a first port 126 in housing portion 60 adapted to be connected through a conduit (not shown) with a source of vacuum or subatmospheric pressure, such as the vacuum manifold on the internal combustion engine of an automobile vehicle. The housing portion 60 is also provided with two ports 127, 128 positioned equidistantly on each side of the vacuum port 126, port 127 communicating compartment 74 with atmosphere through a port extension 130 formed in the housing portion 44 as best illustrated in FIGURE 7.

The housing portion 60 has a planar face 132 on the exterior thereof at the ports 126, 127, 128 on which a valving element 134 is pivotally secured by a screw element 136 directed through a sleeve bearing 138 inserted in element 134 at one end thereof into threaded engagement with the housing portion 60. The sleeve bearing 138 is preferably constructed of a low coefficient of friction material from a grouping of materials set forth in greater detail subsequently.

The opposite end of the valving element 134 has an arcuately-shaped passageway 139 therein having a portion thereof overlying the vacuum port 126 in face 132 and other portions thereof alternately overlying the ports 127, 128 upon limited rotation of the valving element 134 about the pivot point defined by screw element 136 as produced by an actuating linkage assembly 140 of the selector valve assembly to thereby serve to selectively intercommunicate the compartments with atmosphere and a vacuum source so as to cause diaphragm 78 to reciprocate piston rod 86. One feature of valve 125 is that ports 126, 127, 128 are trapezoidally-shaped to require less valve travel in the selecting process.

The valving element 134 is constructed of a plastic material with relatively low coefficient of friction and resilient properties such as are found in the representative group including Zytel, a nylon resin; Alathon, a polyethylene resin; Teflon, a tetrafluoroethylene resin; Delrin, an acetal resin; and nylon, with it being understood that other plastics having low coefficients of friction and relatively good resiliency might be equally well suited for use in the present invention. By so constructing the valving element, it will smoothly slide on the face 132 during the operation thereof. Furthermore, spaced limit bumpers 142, 144 secured on the face 132 on either side of the valving element 134 are constructed of rubber or the like to damp against "clicking" noises or the like in the system.

Referring now more particularly to the valve actuating linkage assembly 140, it will be seen that the assembly comprises a crank arm 146 having one end thereof adapted to be engaged by the surface on piston rod shoulder 88 that faces the large diameter piston end 102. The crank arm 146 has the opposite end thereof secured by a pin 147 to one end 148 of a bent swivel arm 150, the end 148 being rotatably supported in sleeve bearings 152, 154 supported in a protuberance 155 on the housing portion 60 located radially inwardly thereon from the valving element 134. The sleeve bearings 152, 154, like bearing 138 and valving element 134, are constructed of a low coefficient of friction plastic material of the type discussed above for reducing frictional losses caused by rotation of the end 148 of swivel arm 150 by crank arm 146. Opposite end 156 of the bent swivel arm 150 is offset ninety degrees from end 148 and directed through an opening 158 in an elongated cantilevered actuating arm 160 having one end thereof pivotally secured on the axially outermost portion of protuberance 155 by a screw element 162 directed therethrough into threaded engagement with the housing portion 60. In order to minimize galling of arm 150 by arm 160 a hemispherically-shaped bearing surface 165 is formed on arm 150 at the intersection thereof with arm 160.

The opposite end of the actuating arm 160 is slotted at 164 to receive a pin 166 connected to a distributing arm or lever 168 located intermediate the actuating arm 160 and the valving element 134 wherein lever 168 has one of its ends 170 rotatably supported on the screw element 136 by a needle bearing 172 carried by arm end 170. In the illustrated embodiment, the terminus of the bent end 156 of swivel arm 150 is connected to one end of an elongated spring element 174 having the opposite end thereof connected to the outer end of the pin 166 on distributor arm 168 for producing a snap-action of arm 168 when the spring passes to one or the other side of the center axis of pivot screw 136.

The actuating arm 160 is constructed of a light-weight plastic material having a low coefficient of friction, for example, Delrin, whereby frictional losses between it and swivel arm 150 are minimized. Accordingly, upon movement of the crank arm 146 as it engages the shoulder 88, the bent end 156 of swivel arm 150 will oscillate about the axis of the end 148 thereof to move the actuating arm 160 in a limited rotative path about the pivot point thereof to shift the pin 166 along with the intermediate distributor arm or lever 168 in a limited rotative path about the pivot point defined by the needle bearing 172 on screw 138. Upon such limited rotative movement of the distributing arm 168, a tab portion 178 depending therefrom alternately engages spaced surfaces 180, 182 located in the outer face of the valving element 134 on either side thereof with the snap movement of the distributing arm 168 produced by spring element 174 producing a highly responsive selecting action.

In the illustrated embodiment a semicircular spring element 184 connected between an outwardly directed portion 186 on the pivoted end of valving element 134 and a pin 188 fixedly secured to the housing portion 60 radially inwardly of the valving element 134 produces snap action movements of valving element 134 as it begins to be moved by depending tab 178 on distributing arm 168 sufficiently to shift spring 184 into opposite off-center positions.

In the improved distributing valve arrangement, the use of lightweight, low coefficient of friction components including elements of the above-described type along with the shape of ports 126, 127, 128 assures that the assembly will be quickly responsive to the limited actuating force produced by the engagement of shoulder 88 with crank arm 146, and, furthermore, the arrangement of springs 174, 184 in the system will produce a rapid shift of the valving element 134 into its operating positions. This arrangement along with the illustrated lever arm arrangement discussed above produces an actuating assembly having relatively low inertial characteristic and, hence, the limited motive force of the diaphragm 78 will not be substantially dissipated in actuating the selector valve into its operating positions. In order to protect the operative parts of the valve assembly 125 a cap 190 bearing a tubular extension 192 thereon communicating the interior thereof with atmosphere is arranged to cover said operative parts. More particularly, cap 190 is secured to the end face of housing portion 60 by studs 194 and an annular gasket 195 fits between portion 60 and the edge of cap 190 to prevent the entrance of foreign matter thereacross.

While the embodiment of the present invention as herein disclosed constitutes a preferred form, it is to be understood that other forms might be adopted.

What is claimed is as follows:

1. In combination, a pump housing having a first portion and a second portion joined to said first portion to form a chamber, a flexible diaphragm extending transversely within said chamber and having the outer periphery thereof in sealing engagement with the juncture of said housing portions for dividing said chamber into two compartments, each of said housing portions including cylinder means disposed on opposite sides of said diaphragm, one of said cylinder means being of a greater diameter than the other of said cylinder means, piston means in each of said cylinder means, piston rod means connecting said piston means having a portion thereon sealingly connected to said diaphragm means to be reciprocated thereby along with said piston means in said cylinder means, means forming an axial passageway directed through said piston rod means for intercommunicating said cylinder means, means forming an inlet passageway through one of said piston means for communicating one of said compartments with one of said cylinder means, first valve means supported by said one of said piston means for selectively opening and closing said inlet passageway in said one of said piston means upon reciprocation of said piston rod means whereby air is drawn from said one of said compartments and discharged into said axial passageway, second valve means in said axial passageway providing the dual function of a discharge valve from said large diameter cylinder means and an inlet valve for the other cylinder means, means forming ports in said housing for communicating each of said compartments to atmospheric pressure, means forming an additional port in said housing adapted to be connected to a subatmospheric source of pressure, and third valve means actuated by reciprocal movement of said piston rod means for alternately connecting said additional port with one of said compartment ports while leaving the other port exposed to atmosphere to effect a pressure differential across said diaphragm for producing the above-mentioned reciprocation of said piston means in said cylinder means to obtain a two-stage compression of fluid.

2. In the combination of claim 1, said first valve means for controlling communication between said pumping compartment and said first cylinder including an annular disc of flexible material connected at the inner periphery thereof to said one of said piston means to be directed radially outwardly to overlie the end of said large diameter end portion so as to close the inlet passageway therethrough, said annular disc flexing upon reciprocation of said one of said piston means outwardly of said large diameter cylinder means to open said inlet passageway and operable to flex in a direction to close said inlet passageway upon opposite reciprocation.

3. In the combination of claim 1, an annular sealing element on the outer periphery of each of said piston means for slidably sealingly engaging the inner surface of said cylinder means, an annular washer element spaced from said sealing element on the outer periphery of said piston means, and lubricating means impregnating said washer element for reducing friction losses between piston means and cylinder means during relative movement therebetween.

4. In combination, a pump housing a first portion and a second portion joined to said first portion for forming a chamber therebetween, a diaphragm located within said chamber extending transversely thereof having the outer periphery thereof held in sealing engagement between said first and second portions at the juncture thereof for dividing said chamber into two compartments, an elongated piston rod extending through said diaphragm, a first cylinder formed in said first housing portion in axial alignment with said piston rod for supporting one end thereof for sliding engagement therewith, a second cylinder formed in said second housing portion for supporting an enlarged diameter opposite end portion on said piston rod in sliding engagement therewith, means for connecting said diaphragm to said piston rod, means forming a port in each of said housing portions for connecting each of said pumping compartments to a source of atmospheric pressure, means forming an additional port in said housing adapted to be connected with a source of subatmospheric pressure, a movable valving element sealingly engaging said housing including passageway means therein for alternately connecting one of said housing portion ports with said additional port while leaving the other of said housing ports exposed to atmosphere to effect a pressure differential across said diaphragm for reciprocating said piston rod, valve actuator means operatively associated with said piston rod for moving said valving element into selected positions in response to movement of said piston rod to effect a reversal of the pressure differential across said diaphragm by reversing the connection of said housing ports with said additional port and atmosphere, said ports being trapezoidally shaped to limit the valving movement required for intercommunicating said housing portion ports and said additional port, said valve actuator means including lever means located interiorly of one of said compartments to be operatively associated with said piston rod, a bent lever element having one end thereof moved through a limited rotative path by said lever means acting on the opposite end thereof, an actuator arm having one end thereof pivotally secured to said housing, said actuator arm having an opening therein for receiving said one end of said bent lever to operatively connect said actuator arm thereto, linkage means including said actuator arm operable to effect a limited rotational movement of said valving element relative to said ports, first spring means operatively connected between the end of said bent lever and said linkage for biasing said actuator arm into first and second positions, and second spring means operatively connected between said valving element and said housing to snap said valving element into its selected rotative positions upon rotation of said bent lever by said lever means.

5. In combination, a pump housing having a first portion and a second portion joined to said first portion for forming a chamber therebetween, a diaphragm located within said chamber extending transversely thereof having the outer periphery thereof held in sealing engagement between said first and second portions at the juncture thereof for dividing said chamber into two compartments, an elongated piston rod extending through said diaphragm, a first cylinder formed in said first housing portion in axial alignment with said piston rod for supporting one end thereof for sliding engagement therewith, a second cylinder formed in said second housing portion for supporting an enlarged diameter opposite end portion on said piston rod in sliding engagement therewith, means for connecting said diaphragm to said piston rod, means forming a port in each of said housing portions for connecting each of said pumping compartments to a source of atmospheric pressure, means forming an additional port in said housing adapted to be connected with a source of subatmospheric pressure, a movable plastic valving element sealingly engaging said housing including passageway means therein for alternately connecting one of said housing portion ports with said additional port while leaving the other of said housing ports exposed to atmosphere to effect a pressure differential across said diaphragm for reciprocating said piston rod, valve actuator means operatively associated with said piston rod for moving said valving element into selected positions in response to movement of said piston rod to effect a reversal of the pressure differential across said diaphragm by reversing the connection of said housing ports with said additional port and atmosphere, said plastic valving element reducing friction losses during pumping and including a passageway therein for intercommunicating said housing portion ports and said additional port, said valve actuator means including a crank arm located interiorly of one of said compartments to be operatively associated with said piston rod, a bent lever element having a hemispherical portion on one end thereof moved through a limited rotative path by said crank arm acting on the opposite end thereof, an actuator arm having one end thereof pivotally secured to said housing, said actuator arm having an opening therein for receiving the hemispherical portion of said bent lever to operatively connect said actuator arm thereto, linkage means including said actuator arm operable to effect a limited rotational movement of said valving element relative to said ports, first spring means operatively connected between the end of said bent lever and said linkage means for biasing said actuator arm into first and second positions, and second spring means operatively connected between said valving element and said housing to snap said valving element into its selected rotative positions upon rotation of said bent lever by said crank arm.

6. In the combination of claim 5, said actuator arm being constructed of a low coefficient of friction plastic material for reducing noise transmission and for improving valve actuator means responsiveness by reducing inertia therein.

References Cited by the Examiner

UNITED STATES PATENTS

| | | | |
|---|---|---|---|
| 426,762 | 4/1890 | Brookmire | 189—19 |
| 3,148,825 | 9/1964 | De Hoff | 230—52 |
| 3,151,804 | 10/1964 | La Flame | 230—52 |
| 3,151,805 | 10/1964 | Pribonic | 230—52 |

ROBERT M. WALKER, *Primary Examiner.*